March 2, 1954 G. M. MICHIELS 2,670,501
METHOD OF FORMING PLASTIC MATERIAL
Filed Aug. 24, 1951 4 Sheets-Sheet 1
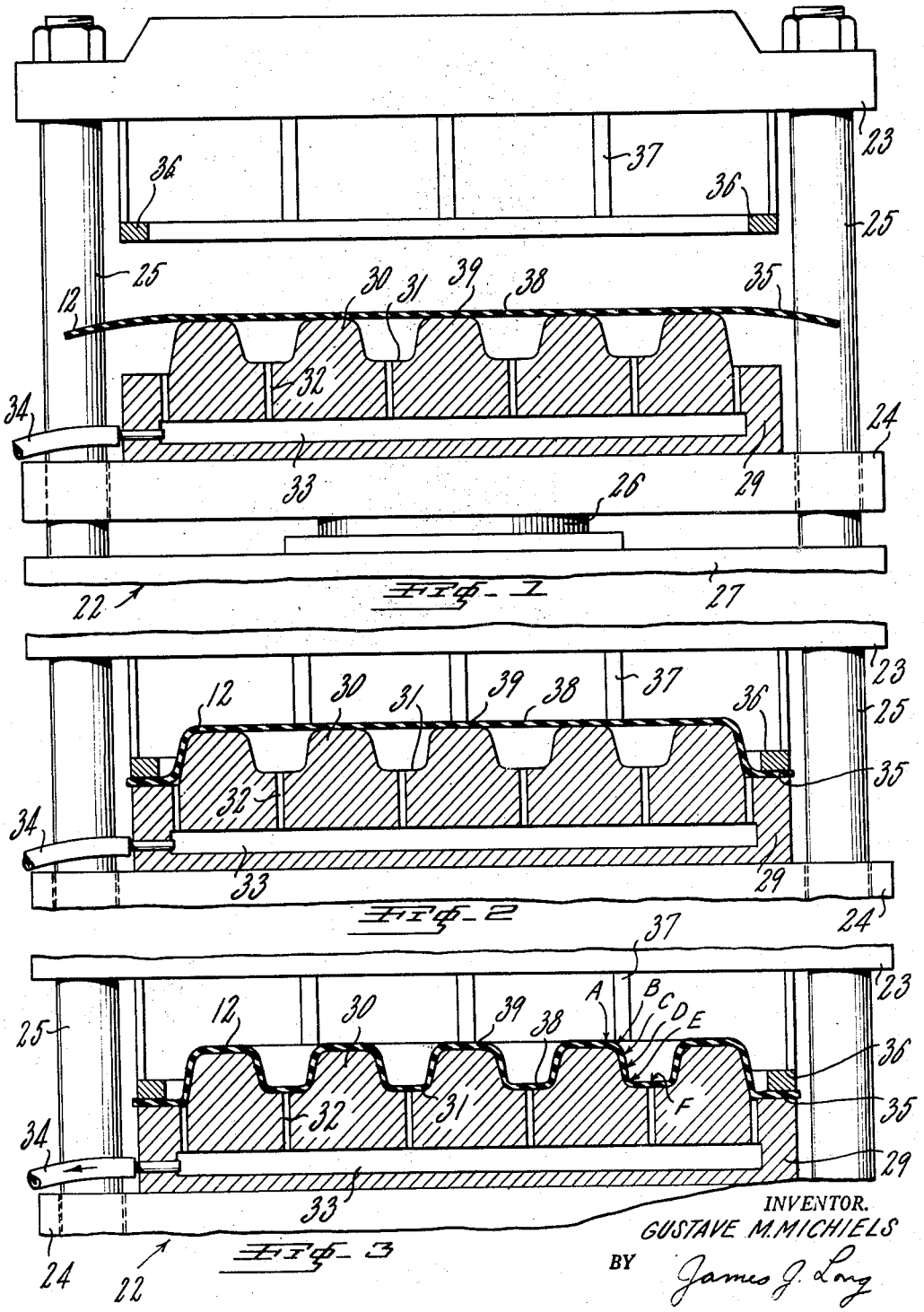
INVENTOR.
GUSTAVE M. MICHIELS
BY James J. Long
AGENT March 2, 1954 G. M. MICHIELS 2,670,501
METHOD OF FORMING PLASTIC MATERIAL
Filed Aug. 24, 1951 4 Sheets-Sheet 2
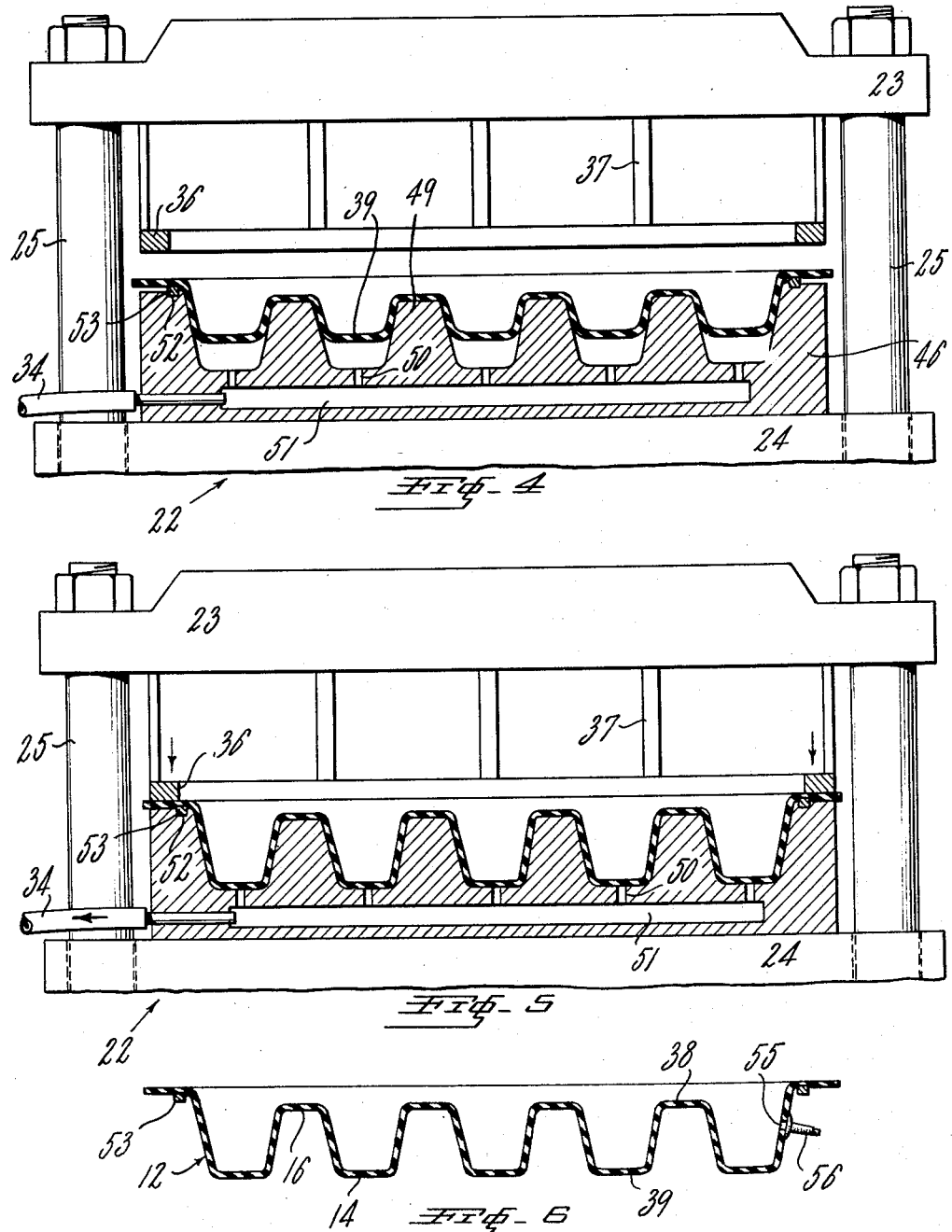
INVENTOR.
GUSTAVE M. MICHIELS
BY James G. Long
AGENT March 2, 1954 G. M. MICHIELS 2,670,501
METHOD OF FORMING PLASTIC MATERIAL
Filed Aug. 24, 1951 4 Sheets-Sheet 3

INVENTOR.
GUSTAVE M. MICHIELS
BY James J. Long
AGENT

March 2, 1954 G. M. MICHIELS 2,670,501
METHOD OF FORMING PLASTIC MATERIAL
Filed Aug. 24, 1951 4 Sheets-Sheet 4
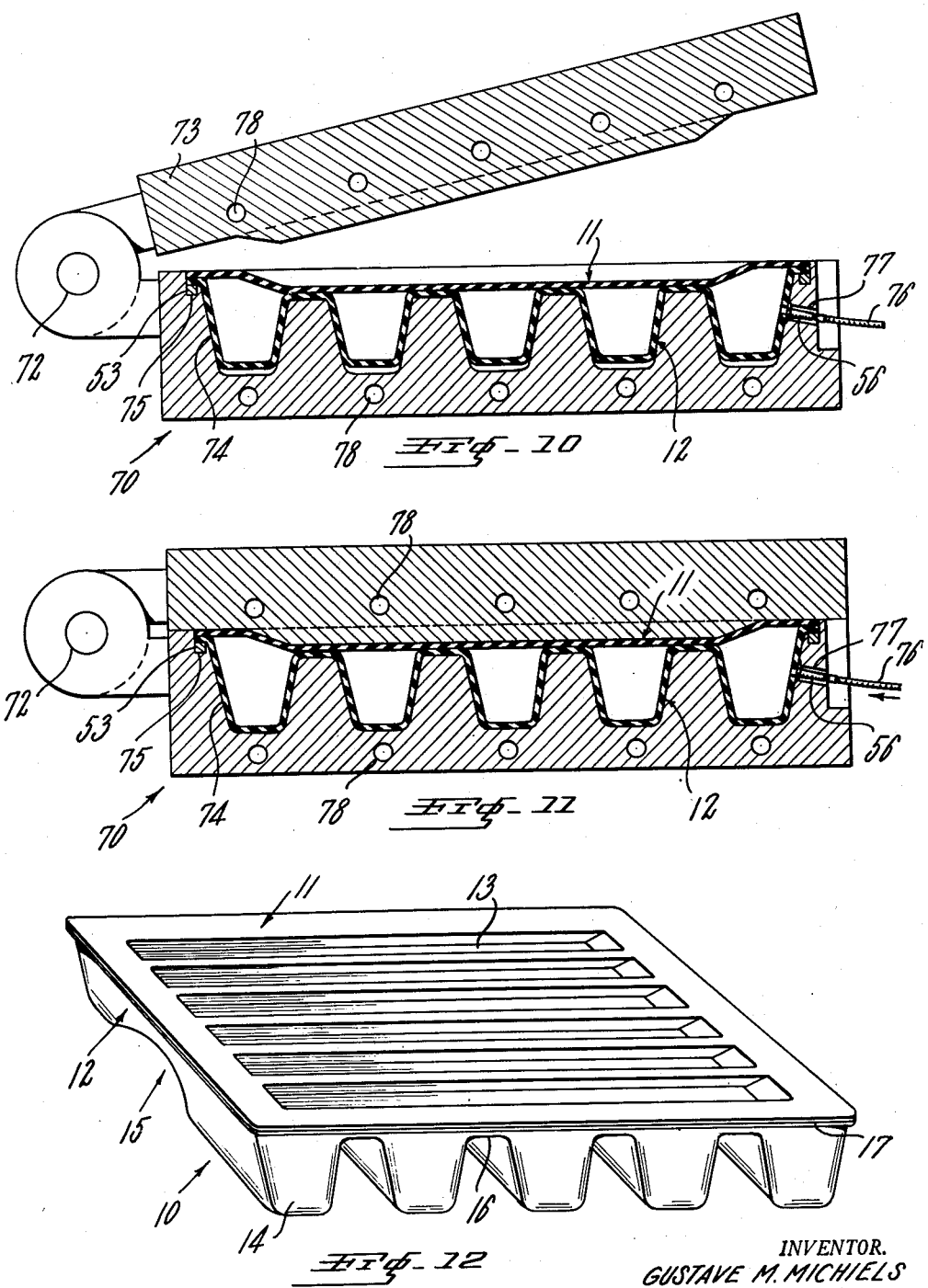
INVENTOR.
GUSTAVE M. MICHIELS
BY James J. Long
AGENT Patented Mar. 2, 1954

2,670,501

UNITED STATES PATENT OFFICE 2,670,501

METHOD OF FORMING PLASTIC MATERIAL

Gustave M. Michiels, Mishawaka, Ind., assignor to United States Rubber Company, New York, N. Y., a corporation of New Jersey Application August 24, 1951, Serial No. 243,510

4 Claims. (Cl. 18—56)

This invention relates to an improved method of forming plastic material, and more particularly it relates to an improved method of shaping sheets of plastic material such as unvulcanized rubber into three dimensional shaped articles having portions deeply drawn or offset with respect to the original plane of the sheet.

In forming sheets of plastic material into three dimensional shaped articles by the prior art methods considerable difficulty has been experienced in producing a final article which has uniform wall thickness. This difficulty is especially pronounced when dealing with relatively large or irregular objects, and when it is desired to draw or offset selected areas of the plastic sheet to a relatively great extent with respect to the original plane of the sheet. Because of this difficulty, it has heretofore proven quite difficult to manufacture from sheet material large irregularly shaped articles of uniform wall thickness, such as pneumatic cushions of the type disclosed in U. S. Patent 1,777,477 to Sampson. Such cushions are intended primarily for use as seat cushions in vehicles. It is of course important that such pneumatic cushions have substantially uniform walls, so that they will inflate uniformly under the influence of internally applied inflation pressure, to produce the desired riding characteristics.

Accordingly, a principal object of the present invention is to provide an improved method of producing relatively large three dimensional shaped articles from plastic sheet material.

Another object of the invention is the provision of a method for drawing selected areas of a sheet of plastic material with respect to other areas thereof.

Still a further object is to provide a method of shaping plastic sheets into three dimensional articles of controlled wall thickness.

It is an additional object of the invention to provide an improved method of retaining a preformed heat curable plastic article in a desired shape, preparatory to curing the preformed article by application of heat.

The manner in which the invention accomplishes the foregoing objects, as well as other objects and advantages, will be made manifest in the following detailed description, which is intended to be read with reference to the accompanying drawings, wherein:

Fig. 1 is an elevational view of a molding press, partly in section, adapted for carrying out the first step in one method of making pneumatic cushions from plastic sheets in accordance with the invention;

Figs. 2 and 3 are similar views showing the press in the closed position for subsequent steps in shaping a plastic sheet;

Fig. 4 is a similar view of a second molding press in the open position for further shaping of the plastic sheet in the form of a pneumatic cushion;

Fig. 5 is a similar view of the press of Fig. 4 in the closed position;

Fig. 6 is a sectional elevational view of a portion of a preformed pneumatic cushion removed from the press;

Fig. 10 is a sectional elevational view of a vulcanizing mold with a preformed cushion disposed therein;

Fig. 11 is a similar view of the vulcanizing mold in a closed position; and

Fig. 12 is a perspective view of the completed vulcanized cushion.

Figure 7:
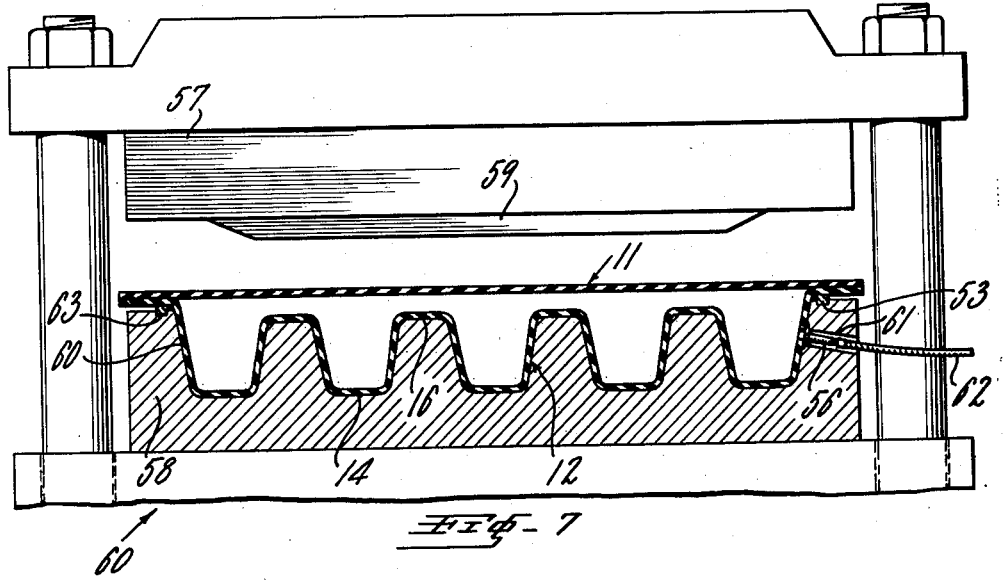
Figs. 7 and 8 are sectional elevational open and closed views, respectively, of an additional mold for further shaping and assembling of plastic sheets in the form of a pneumatic cushion.

The invention contemplates shaping a plastic sheet into a three dimensional article by drawing selected areas of the sheet, thereby offsetting such areas from the original plane of the sheet and simultaneously causing the sheet to become thinned out in such selected areas, and thereafter drawing the remaining areas of the sheet, causing said remaining areas to be thinned out to substantially the same thickness as the first drawn selected areas. Conveniently, the method of the invention is carried out with the aid of two forms or molds which are essentially complementary to each other in shape. One of such forms is adapted to perform the initial drawing of selected areas of the sheet, and the second such form is adapted to carry out a second drawing of remaining areas. The plastic sheet is most conveniently caused to conform to the shape of such molds or forms by application of differential pressure, typically pneumatic pressure, which may either be a superatmosphere pressure applied to the outer surface of the sheet to cause the inner surface to conform to the mold or form, or atmospheric pressure may be utilized to cause the sheet to conform to the mold, by application of suction or vacuum between the sheet and the mold. Usually the objects of the invention are best served by pneumatically forcing portions of a plastic sheet of uniform thickness into conformity with a male core or form having projections corresponding in length, width, and location to projections in the finally desired article, but having an appreciably lesser depth than the projections in the final article. As the plastic sheet is forced into contact with such a male form, the portions or areas of the sheet which extend into the depressions located between the projections of the form become thinned out so as to decrease the wall thickness of such areas proportionately with the depth of the depression. The thus partially preformed sheet is removed from the male form and placed in a female mold which is the complement of the male form and which typically has projections defining cavities having the size and shape of the projections in the final article. The thinner wall portions of the sheet previously formed lie on the projections of the female mold and the thicker wall portions are disposed in the cavities of the mold. The thicker portions are then pneumatically forced into the cavities, thereby thinning out such thicker portions proportionately to the depth of the cavities, and thus producing a finally shaped article of substantially uniform wall thickness.

Referring to the drawings, the embodiment of the invention shown therein constitutes a method for making a hollow rubber pneumatic cushion 10, as shown in Fig. 12, comprised essentially of an upper sheet 11 and a lower sheet 12. The upper sheet 11 has a plurality of spaced parallel longitudinal depressions 13, extending inwardly from the upper face of the cushion to a uniform depth. The lower sheet 12 has a plurality of relatively deep lobes or projections 14 running transversely of the cushion and extending downwardly from the lower face thereof. The deep projections or lobes 14 are not uniform in depth throughout their length, but have an upwardly curved shallow portion 15 located toward the rear of the cushion. The projections 14 serve to define intermediate equally spaced parallel depressions 16 in the lower part of the cushion. The upper sheet 11 and lower sheet 12 are essentially flat at their edge portions, and are united during vulcanization of the assembly along their contacting edge faces to form a peripheral seam 17.

To preform the cushion 10 there is first provided, as indicated in Fig. 1, a flat sheet of soft, pliable, unvulcanized rubber stock 12 which is to make up the lower portion of the cushion. The sheet 12 may be formed in any conventional desired manner, such as by extruding or calendering, and is initially shaped with the aid of a vertically operating press 22 having a fixed upper horizontal platen 23 and a movable lower horizontal platen 24, adapted to be raised or lowered on vertical guide rods 25 by the usual hydraulic piston 26 contained in the base 27 of the press. The upper surface of the lower platen carries a male form or core piece 29 that is provided with a series of parallel upwardly extending projections 30 spaced according to the spacing of the projections 14 of the finished cushion 10, and equal in length and width to the projections 14. Between the projections 30 there are provided female mold cavities 31, which correspond in location and in width and length to the depressions 16 in the lower portion of the cushion 10 intermediate the projections 14, but the cavities 31 do not have as great a depth as the final depressions 16. The cavities 31 are typically only slightly more than one-half as deep as the depressions 16 in the cushion, for example, approximately 60% as deep. At each side of the base of each of the projections 30, there are provided vertically extending evacuating passageways 32 passing from the surface of the core 29 through the body of the core into communication with an interior vacuum chamber 33 within the core, that is connected by means of a hose 34 to a conventional source of suction (not shown).

The unvulcanized sheet 12 is initially laid on top of the projections 30 on the form 29, and thereafter the lower platen 24 of the press 22 is raised by means of the hydraulic piston 26, thereby bringing the marginal edge portions 35 of the sheet into contact with a clamping ring or frame 36 that is supported in spaced relation below the upper platen 23 by means of support rods 37 extending downwardly therefrom and fixed to the upper surface of the ring 36. The clamping ring or frame 36 presses the edge portions 35 of the sheet firmly against the upper edge surface of the core 29, as shown in Fig. 2. With the press in the closed position, suction is then applied at the hose 34, thus removing the air from the chamber 33 and passageways 32, and from between the surface of the form 29 and the inner surface of the sheet 12. The atmospheric pressure forces those portions 38 of the sheet 12 which bridge the cavities 31 downwardly into engagement with the side and bottom walls of the cavities, as shown in Fig. 3. This operation may typically require, for example, about 20 seconds. As a result of this drawing operation the portions 38 of the sheet 12 which bridge the cavities 31 are distended to a thinner wall thickness than the portions 39 of the sheet disposed in contact with the upper surface of the projections 30 on the core piece 29. The reason for this is that the portions 39 of the sheet in contact with the projections are essentially held in place by the external pressure of the atmosphere, and the required increase in area of the sheet due to stretching is provided by a thinning out of the material 38 which bridges over the projections. For example, it has been found that with a sheet 12 having an initial uniform thickness of about 0.085 inch, the thickness of the sheet after the drawing operation, as represented in Fig. 3, decreases gradually from a maximum of about 0.080 inch at the top of the projections 30 to a minimum of 0.035 inch at the base of the cavities 31. This gradual decrease in thickness of the partially preformed sheet as a result of the drawing is typified by the following exemplary data, showing the thickness of the drawn sheet at the various lettered points designated in Fig. 3:

| | Inch |
|---|---|
| Point A | 0.080 |
| Point B | 0.070 |
| Point C | 0.060 |
| Point D | 0.050 |
| Point E | 0.040 |
| Point F | 0.035 |

From this it will be seen that the thickness of drawn partially preformed sheet varies in inverse proportion to the distance of the draw, that is, to the distance from the upper surface of the projections 30. When preformed as shown in Fig. 3, the projections and depressions in the sheet 11 have the same width and length as in the finished cushion, but only about one-half of the finally required depth.

In the next step of the process, the partially preformed sheet 12, after opening the press and removal of the sheet from the form 29, is subjected to a further preforming operation in which the remaining previously undrawn relatively thicker portions 39 of the sheet are drawn to produce a uniform wall thickness in the sheet, and at the same time to extend the projections to the desired depth. For this purpose, there is provided in the press 22, as shown in Figs. 4 and 5, a second preforming mold member 46 on the upper surface of the lower movable platen 24. The second preforming mold 46 is a female mold and has a series of cavities 48 extending downwardly, between intermediate upwardly projecting portions 49. The female mold 46 is essentially complementary to the male form 29 with the exception that the cavities 48 in the female mold are deeper than the projections 30 of the male form. The cavities 48 are generally preferably essentially equal in depth to the depth of the final projections 14 in the cushion, although, if desired, they may be somewhat less in depth, for example, they may be 90% of the final depth of the projections.

The sheet 12 is disposed in the female preforming mold 46 with the thicker undrawn portions 39 of the sheet, which rested on the projections 30 in the male form 29, extending downwardly partially into the female cavities 48. Conversely, the thinner previously drawn portions 38 of the sheet which extended into the cavities 31 of the male form 29, now rest on the upper surface of the upwardly extending portions 49 of the female preforming mold 46. It will be noted that in this manner the portions 38 of the sheet 12 which were reduced in thickness by the previous drawing operation are now supported on the upper surface of the projections 49, while the portions 39 which were not appreciably reduced in thickness in the previous drawing operation, now bridge the depressions or cavities 48 at an intermediate depth therein, as indicated in Fig. 4.

The female mold 46 is also provided with suction openings 50 which extend from the cavities 48 to a vacuum chamber 51 within the mold, and the vacuum hose 34 is coupled to a line leading to this chamber. On its upper peripheral surface the mold 46 is provided with a recess 52 that extends completely around the mold and that accommodates a rigid supporting ring 53, usually a metal ring, which is disposed therein prior to placing the partially preformed sheet 12 in the mold. The lateral edges of the partially preformed sheet 12 extend across the upper surface of the supporting ring 53 when the sheet is in place in the mold.

The press 22 is then closed as indicated in Fig. 5 to bring the female preform mold 46 upwardly against the clamping ring 36. In this position the lower peripheral edge surface of the sheet 12 is pressed against the ring 53. Because of the tackiness of the unvulcanized rubber sheet 12, it adheres temporarily to the upper surface of the supporting ring 53. The surface of the ring 53 is preferably roughened, as by knurling, to promote adhesion of the sheet 12 to the ring. Suction is then applied through the hose 34, chamber 51, and passages 50 to the interior of the cavities 48, thereby drawing the thicker portions 39 of the partially shaped lower sheet 12 downwardly into contact with the lower surface of the mold cavities 48. This causes the thicker previously undrawn portions 39 to be drawn out proportionately to essentially the same thickness as the previously drawn portions 38. It will be noted that the proportions of the thinning out of the sheet 12 during the second drawing operation are essentially inverse to the proportions of the thinning out which took place in the first drawing operation, that is, those portions which were least drawn in the first preforming operation are most drawn in the second preforming operation, while those portions which were drawn to an intermediate extent in the first operation are again drawn to an intermediate extent in the second operation, and those portions which were most drawn in the first operation are least drawn in the second operation. The combined results of the two complementary drawing operations is therefore to produce a finally preformed sheet 12 of substantially uniform wall thickness, because all parts thereof have been drawn or stretched to about the same extent.

The suction is then released, the press is opened, and the metal ring 53 is pried from the recess 52 in the mold 46, and with the aid of the metal ring as a support the formed sheet 12 is removed from the mold 46 in the form shown in Fig. 6. Since the sheet 12 is as yet in a raw unvulcanized state, it is in a rather limp easily distortable condition, but the rigid metal ring 53 provides a means for the necessary handling of the sheet without distorting it from its preformed shape. A hole 55 is punched at the outer side of the formed sheet 12 and an inflating valve assembly 56 is applied thereover.

Figure 8:
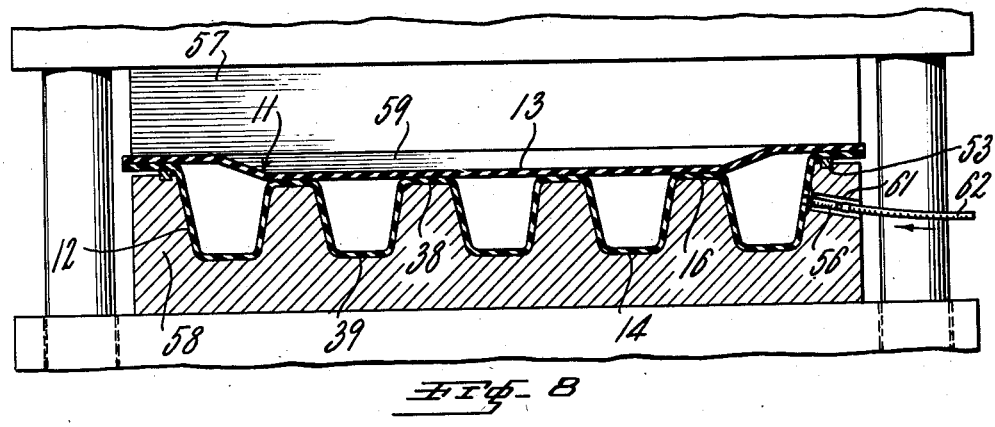

In order to form the upper sheet 11 of the cushion and unite it to the formed lower sheet 12, the press is provided, as indicated in Figs. 7 and 8, with an upper male form 57 for forming the upper sheet 11 and a lower female mold 58 to contain the formed lower sheet 12. The upper male form has downwardly extending parallel longitudinal projections 59 on its undersurface for forming the depressions or recesses 13 in the upper surface of the finished cushion 10. The cavity 60 of the lower female mold corresponds essentially in outline to the shaped lower sheet 12, and is provided at one side with an opening 61 through which the valve stem 56 extends for coupling to an air hose 62.

The formed lower sheet 12 is placed in the cavity 60 of the lower female mold 58 with the aid of the supporting ring 53 adhered thereto, such ring being accommodated in a peripheral recess 63 in the upper face of the mold. As indicated in Fig. 7, the sheet 11 is laid over this in flat form while the press is in the open position. Thereafter, the press is closed as indicated in Fig. 8 to bring the mold halves 57, 58 together. The sheets 11 and 12 are pressed together and united around their edges to form the seam 17, and the bottoms of the recesses 13 in the upper sheet 11, formed by the projections 59 of the form, also contact the upper surfaces of the recesses 16 between the lobes 14 of the lower sheet 12 of the cushion. The contacting portions adhere together because of the natural tackiness of the unvulcanized rubber, which may be augmented, if desired, by applying gasoline to the surfaces to be joined. During this operation air pressure is applied to the interior of the cushion by means of the hose 62 on the valve stem 56.

After this forming operation the internal pressure is released and the mold is opened. The excess projecting edges 65 of the sheets 10 and 11 extending outwardly from the ring 53 are trimmed off even with the outer edge of the supporting ring 53, usually while the assembly is still in the mold 58, using the outer edge of the ring as a guide, and this excess unvulcanized material may be returned to the rubber mill or calender for reuse.

Figure 9:
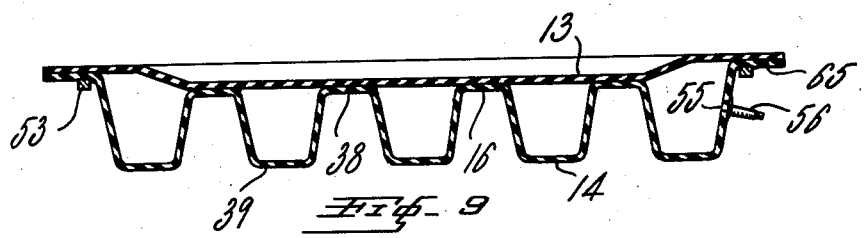
Fig. 9 is a sectional elevational view of a preformed cushion removed from the mold of Figs. 7 and 8.

The preformed cushion, still borne on the supporting ring 53, is removed from the mold as shown in Fig. 9, and is thereafter placed in a watch case type of vulcanizing mold 70 (Fig. 10), comprised of a lower female portion 71 to which is hinged at 72 an upper male portion 73. The mold halves 70 and 73, when brought together as indicated in Fig. 11, define a closed mold cavity 74 having the external contour of the finally desired shape of the cushion. Because the lower sheet 12 was drawn to only about 90% of its final depth, it does not entirely fill the cavity 74 at this stage. A peripheral recess 75 extending around the upper surface of the lower mold half 71 near the edge of the mold cavity 74 serves to accommodate snugly the supporting ring 53. After the mold 70 is closed under pressure as indicated in Fig. 11, internal fluid pressure is applied to the interior of the cushion, usually air pressure, through a hose 76 attached to the valve stem 56 which extends outwardly through a suitable hole 77 in the wall of the lower mold half 61. This causes the sheet 12 to expand the final amount to fill out the cavity 74 entirely. The mold portions 71 and 73 are provided with internal passageways 78 through which a heating medium may be passed in the conventional manner to heat the assembled cushion to vulcanizing temperatures for a sufficient period of time to effect vulcanization thereof. After vulcanization, the finished cushion 10 is removed from the mold and has the appearance shown in Fig. 12. The contacting peripheral edges of the sheets 11 and 12 become firmly united together during vulcanization, providing a tight seam 17. Since the rubber loses its tackiness upon vulcanization, the metal supporting ring 53 does not adhere to the cushion after vulcanization, and therefore it forms no part of the completed cushion, but is removed therefrom for reuse in producing a subsequent cushion.

From the foregoing, it is evident that the invention provides a convenient method for drawing sheet material into shapes of exceptionally uniform wall thickness, even though the shape may be large and quite irregular in configuration. By effecting the shaping of the sheet in distinct stages, in which separate areas of the sheet are selectively drawn, all areas of the sheet are subjected to essentially the same degree of thinning out, and therefore the shaped sheet has essentially the same thickness in all areas. This is particularly important in the case of pneumatic cushions of the type described because such cushions are intended to be used in the seats of vehicles, and it is found that the riding characteristics of the cushions are undesirably changed by variations in the wall thickness, due to the non-uniform inflation resulting from such variations in wall thickness.

While the invention has been described with particular reference to the shaping of sheets of vulcanizable rubber stock, it will be evident that sheets of thermoplastic materials may be shaped in a similar manner. If desired, the sheet may be heated to an elevated temperature to render it more readily deformable during the shaping operations.

Although the embodiment of the invention described in detail utilized a male form for the initial preforming operation, and a female mold for the second stage of the preforming, it is apparent that in appropriate cases, for example, if the particular article being made requires no top portion, or if vulcanization of the article is not required, the preforming operations can be interchanged with similar results. In other words, a female mold having a cavity of lesser depth than the finished article may be used to impart a first preshape to the flat sheet and a male form of the finally finished size may be used for the final shaping. It is only required that the two shaping devices be complementary.

In the form of the invention shown, the shaped cushion was removed from the final mold for vulcanization in a separate mold, but it is evident that if desired, the vulcanization could be effected in the final shaping mold by heating the same to vulcanizing temperatures. However, it is found more advantageous in practice to accomplish the final vulcanization in a separate mold. In this way, a completely preformed cushion can be transferred immediately to a previously heated vulcanizing mold as soon as a previously cured cushion has been removed from the mold. In this way, the heated vulcanizing mold may be kept in use substantially continuously for the vulcanization operation, and it is not necessary to employ the vulcanizing mold for any part of the preshaping operation. This represents a substantial economy because the vulcanizing mold is considerably more expensive to build and operate than are the preforming molds, and it would not be economically expedient to utilize the vulcanizing mold for an operation that is more easily carried out in simpler, less expensive equipment. The preforming molds can be constructed relatively inexpensively of wood, plastic or any other suitable material which is easily shaped, whereas the vulcanizing mold must of course be made from metal. Also, by utilizing a separate mold for the final vulcanization it is possible to more conveniently remove the excess unvulcanized edge portions of the preformed article, which may be reused since they are unvulcanized. In this way waste of material is avoided, since if this excess edge material were vulcanized it could not be reused.

The use of a temporary supporting ring is particularly advantageous in connection with the preferred method of vulcanizing in a separate mold, since such a supporting ring makes it possible to remove the vulcanized form from the preforming mold and insert it properly in the vulcanizing mold without distortion. Ordinarily, a preformed article of relatively great bulk and irregular shape could not be handled or transferred from one mold to another without danger of disrupting it, but the present invention, by providing a rigid supporting means in association with the preformed shape, substantially eliminates this difficulty.

In some cases, where some portions of the article are relatively deeply drawn, it may be advantageous to carry out the preforming operation in more than two stages. For example, selected portions of the article may initially be drawn to a definite fraction of the depth of projections in the final article, and thereafter remaining portions may be drawn to an extent such as to produce less than the finally required depth. In a final preforming operation the entire article may then be expanded or drawn further to its final shape, either in a final preforming mold, or in the ultimate vulcanizing mold having the shape of the desired article. Articles of more uniform wall thickness than realizable with conventional practice may be obtained in this way.

The method of the invention produces articles of most uniform wall thickness when the projections or offset portions in the final article are essentially equally spaced and essentially equal in width to intermediate recesses defined by the projections. Such construction permits the most exact balancing of the degree of thinning out of the various areas in successive drawing operations. However, even in those cases where the projections are irregularly placed and of varying width, the method of the invention is still applicable with results substantially superior to those obtained by prior art practices in shaping plastic sheets. In one aspect, the invention may be regarded as involving at least two drawing operations which take place in opposite directions with respect to the original plane of the sheet, in different areas of the sheet. Thus, selected areas may first be drawn partially in one direction with respect to the original plane of the sheet, and remaining areas may be drawn in an opposite direction with respect to the first drawing operation, producing a relative off-setting of the first selected areas with respect to the remaining areas which is equal to the sum of both drawing operations. Such off-setting has been accomplished by drawing each area to a lesser extent than would be necessary if the same amount of off-setting had been produced by drawing the material in a single direction. Consequently, when using the present method, no single area of the sheet need be distended to an undue extent, producing excessive thinning out, even though the final off-setting of selected areas in the finished article is relatively deep.

A particularly advantageous feature of the invention lies in the fact that it is applicable to forming articles in which the projections vary in height along their length. The prior art practices of drawing sheets have proven especially difficult of practical application in such cases, but the present invention can be applied here conveniently and with highly favorable results.

Having thus described my invention, what I claim and desire to protect by Letters Patent is:

1. A method of shaping a plane sheet of plastic material of uniform thickness into the form of an article having spaced portions relatively deeply off-set with respect to the original plane of the sheet comprising in combination the steps of distending selected areas of the sheet located between said off-set portions away from the original plane of the sheet while substantially maintaining remaining areas of the sheet corresponding to the final off-set portions in the original plane of the sheet, and thereafter distending said remaining areas away from said first selected areas while substantially maintaining said first selected areas in the plane to which they were distended, to produce a desired relative off-setting of said first selected areas with respect to said remaining areas.

2. A method of shaping a sheet of plastic material into the form of an article having relatively deep spaced projections comprising in combination the steps of providing a form having width and length dimensions equal to those of the finished article and having a plurality of projections having depth dimensions less than the depth of projections in the finished article, placing a uniformly thick plastic sheet over said form, pneumatically distending spaced portions of said sheet into depressions located between the projections of said form so as to decrease the wall thickness of said portions proportionately with the depth of said depressions, while the areas of the sheet in contact with the projections of said forms are essentially supported against distention, removing the thus partially preformed sheet from said form, providing a second form which is complementary to said first form, said second form having cavities which are substantially equal in depth to the projections in the finished article, placing the partially preformed sheet in the second form with the areas of the sheet that contacted the projections of the first form extending into the cavities of the second form to an intermediate depth thereof, and pneumatically distending said last mentioned areas into said cavities to reduce the wall thickness of said areas proportionately to the depth of the cavities, while the said first distended portions are supported against distention on the portions of the second form intermediate said cavities, thereby producing an article of the desired shape having substantially uniform wall thickness.

3. A method of making a shaped plastic article from a plane sheet of plastic comprising in combination the steps of drawing spaced selected areas of the uncured sheet partially to the desired shape in a first mold, while supporting remaining areas of the sheet intermediate said selected areas to prevent said remaining areas from being drawn substantially, and subsequent drawing the said remaining areas of the sheet in an opposite direction in a second mold complementary to the first mold, while supporting said first selected areas to prevent said selected areas from being drawn substantially.

4. A method of making a cured plastic article having relatively deep spaced projections comprising in combination the steps of distending spaced selected portions of a uniformly thick heat curable plastic sheet into conformity with a form having width and length dimensions equal to those of corresponding parts of the finished article and depth dimensions less than those of the finished article so as to decrease the wall thickness of said selected portions proportionately with the depth to which said selected portions are forced, the remaining areas of the sheet intermediate said selected portions being held in place in the original plane of the sheet during said distending step, removing the thus partially shaped sheet from said form, placing the partially shaped sheet in a second form which is complementary in shape to said first form and having depth dimensions which are equal to those of the finished article, said second form having a detachable rigid supporting member disposed around its periphery, distending said remaining areas of the sheet into contact with said form so as to decrease the wall thickness of said remaining areas proportionately to the depth to which said areas are forced, while supporting the sheet against distention at the previously distended portions thereby producing a preform of the desired shape with walls of substantially uniform thickness, pressing the edge portions of the sheet into contact with said rigid supporting member to cause the sheet to adhere temporarily thereto, lifting said supporting member from said second mold with the preformed sheet adhered thereto at its edges, disposing the supporting member, with the sheet still temporarily adhered thereto, in a final curing mold having the shape of the desired article, heating the final curing mold to cure the shaped sheet, and removing the supporting member from the cured article.

GUSTAVE M. MICHIELS.

References Cited in the file of this patent

UNITED STATES PATENTS

| Number | Name | Date |
|---|---|---|
| 1,283,630 | Bean et al. | Nov. 5, 1918 |
| 1,764,215 | Kupper | June 17, 1930 |
| 2,007,548 | Sampson | July 9, 1935 |
| 2,142,445 | Helwig | Jan. 3, 1939 |
| 2,350,996 | Atkinson et al. | June 13, 1944 |
| 2,367,642 | Helwig | Jan. 16, 1945 |
| 2,441,097 | Hicks | May 4, 1948 |
| 2,468,697 | Wiley | Apr. 26, 1949 |
| 2,573,609 | Robinson | Oct. 30, 1951 |
| 2,575,764 | Morner | Nov. 20, 1951 |